United States Patent [19]

Ochiai et al.

[11] Patent Number: 4,710,091

[45] Date of Patent: Dec. 1, 1987

[54] LOADING AND UNLOADING APPARATUS

[75] Inventors: Toshio Ochiai, Tokyo; Akio Tsujimura, Kawasaki; Hiroshi Tsukiyasu, Yuki, all of Japan

[73] Assignees: Toyo Seikan Kaisha, Ltd.; Komatsu Forklift Kabushiki Kaisha, both of Tokyo, Japan

[21] Appl. No.: 798,273

[22] Filed: Nov. 15, 1985

[30] Foreign Application Priority Data

Nov. 16, 1984 [JP] Japan ................................ 59-240497

[51] Int. Cl.[4] ................................................ B60P 1/00

[52] U.S. Cl. .................................... 414/623; 414/607; 414/785; 414/36; 187/9 R; 294/88; 294/119.1

[58] Field of Search ............... 414/623, 621, 622, 618, 414/619, 620, 785, 607, 608, 36; 294/88, 119.1, 67.33, 67.1; 187/9 R

[56] References Cited

U.S. PATENT DOCUMENTS

| | | | |
|---|---|---|---|
| 2,841,302 | 7/1958 | Reisman et al. | 414/621 X |
| 2,866,504 | 12/1958 | Syers, Sr. | 414/621 X |
| 2,896,994 | 7/1959 | Fischer | 414/623 X |
| 3,262,595 | 7/1966 | Seip, Jr. et al. | 414/621 |
| 3,797,684 | 3/1974 | Brandt | 414/622 X |
| 4,185,944 | 1/1980 | Seaberg | 414/621 |
| 4,331,320 | 5/1982 | Naruse et al. | 414/623 X |

FOREIGN PATENT DOCUMENTS

| | | | |
|---|---|---|---|
| 1189503 | 10/1959 | France | 414/623 |

*Primary Examiner*—Frank E. Werner
*Attorney, Agent, or Firm*—Armstrong, Nikaido Marmelstein & Kubovcik

[57] ABSTRACT

In a loading and unloading apparatus, a plurality of guide rails are disposed as directed in the horizontal direction on a front surface of a support plate for a main body of the loading and unloading apparatus, which support plate has a fork at its bottom portion, base portions of a pair of arms which can be arbitrarily opened and closed in the directions of coming close to and separating from each other for clamping and releasing an object, are movably supported by these guide rails, and at the tip end portions of the respective arms are provided hooks which can be arbitrarily moved in the back and forth directions of the arms.

1 Claim, 4 Drawing Figures

LOADING AND UNLOADING APPARATUS

BACKGROUND OF THE INVENTION

1. Field of the Invention

The present invention relates to a loading and unloading apparatus to be used upon loading and unloading sheet materials such as thin iron plates, paper sheets, plastics sheet which are stacked into a pile.

2. Description of the Prior Art

Heretofore, in the case of conveying sheet materials such as thin iron plates or the like which are stacked into a pile by means of a working vehicle such as a forklift, an unmanned conveying vehicle or the like, the sheet materials b were stacked into a pile on a palette a as shown in FIG. 3, and this pile of sheet materials was conveyed by a working vehicle c such as a forklift, an unmanned conveying vehicle or the like as shown in FIG. 4.

However, since the sheet materials b such as iron plates are liable to slip relative to each other, in the event that the working vehicle c has made an abrupt turn or a sudden stop during loading and unloading, there was a fear that the sheet materials b might slip out of the pile on the palette due to a centrifugal force or an inertial force as shown in FIG. 4, resulting in troubles in the loading and unloading work.

SUMMARY OF THE INVENTION

It is therefore a general object of the present invention to provide a novel loading and unloading apparatus for sheet materials which is free from the above-mentioned shortcoming of the loading and unloading apparatus in the prior art.

A more specific object of the present invention is to provide a loading and unloading apparatus which can reliably hold a pile of sheet materials thereon with only simple additional means so that the sheet material may not slip out of the pile even upon an abrupt turn or a sudden stop of the loading and unloading apparatus.

According to one feature of the present invention, there is provided a loading and unloading apparatus comprising a movable vehicle body, a vertically movable main body including a fork provided in front of the vehicle body for lifting a pile of sheet materials, a plurality of horizontal guide rails disposed on a front surface of the main body, a pair of arms supported at their base portions by the horizontal guide rails so as to be slidable along the guide rails and extending in the forward direction, first drive means coupled between the respective arms and the main body for moving the respective arms close to or away from each other, front stopper means provided at the free ends of the respective arms so as to be movable in the back and forth directions, and second drive means coupled between the front stopper means and the corresponding arms for moving the respective stopper means close to or away from the free ends of the respective arms.

With the loading and unloading apparatus according to the present invention constructed in the above-mentioned manner, a pile of sheet materials on a palette to be conveyed for loading or unloading is lifted up by the vertically movable fork as inserted below the palette under the condition that the pair of arms, which preferably have a vertical planar shape, are separated laterally from each other along the horizontal guide rails by the action of the first drive means and the front stopper means are displaced away from the free ends of the corresponding arms by the action of the second drive means, then the pair of arms are moved close to each other by the first drive means until they butt against the opposite side surfaces of the pile of sheet materials, and finally the front stopper means are retracted towards the free ends of the arms by the second drive means until they are brought into contact with the front surface edges of the pile of sheet materials. Thus, since the pile of sheet materials are rigidly held by the pair of arms and the front stopper means to be prevented from slipping out, even when the movable vehicle body of the loading and unloading apparatus makes an abrupt turn or a sudden stop, there is no fear that the sheet materials on the palette may slip out of the pile, and so, no trouble would occur in the loading and unloading work.

The above-mentioned and other objects, features and advantages of the present invention will become more apparent by reference to the following description of a preferred embodiment of the invention taken in conjunction with the accompanying drawings.

DESCRIPTION OF THE PREFERRED EMBODIMENT

Figure 1:
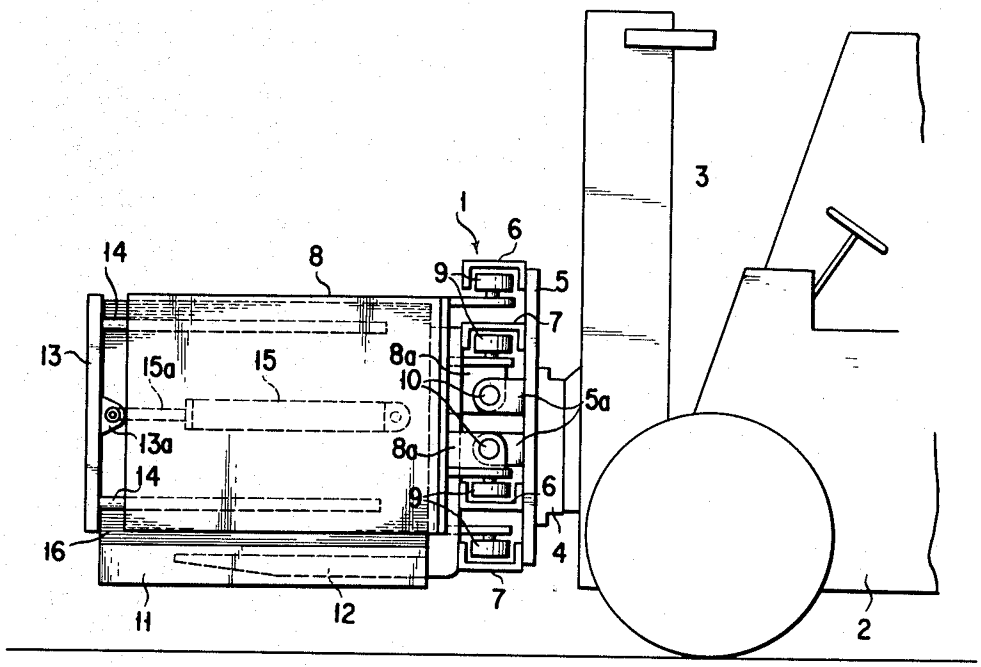
FIG. 1 is a side view showing one preferred embodiment of the present invention.
Figure 2:
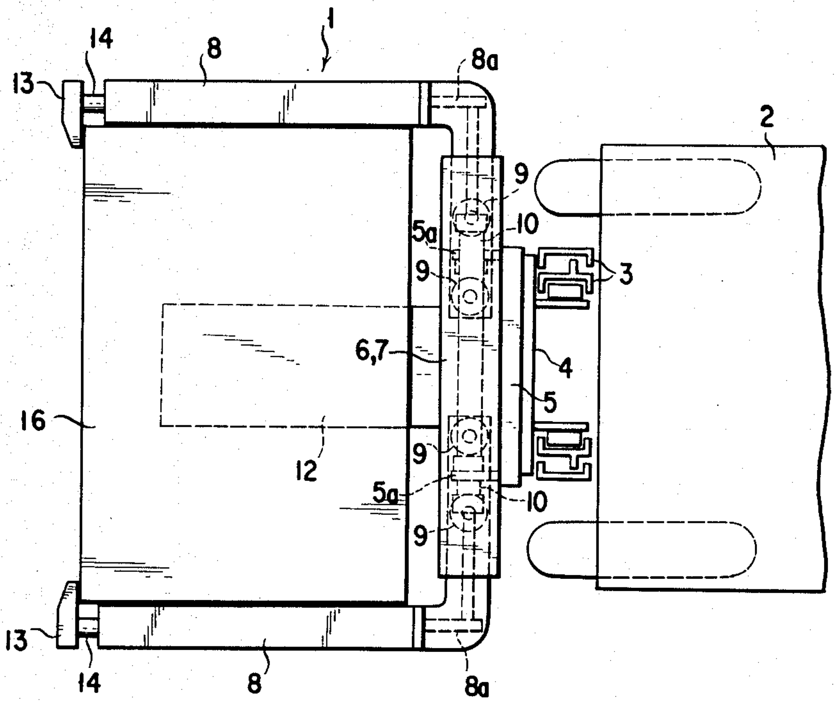
FIG. 2 is a plan view of the apparatus shown in FIG. 1.
Figure 3:
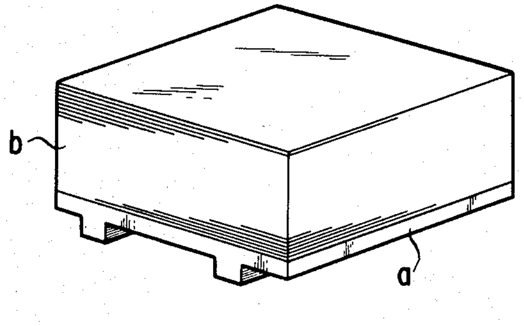
FIG. 3 PRIOR ART
FIG. 3 is a perspective view showing a pile of sheet materials placed on a palette.
Figure 4:
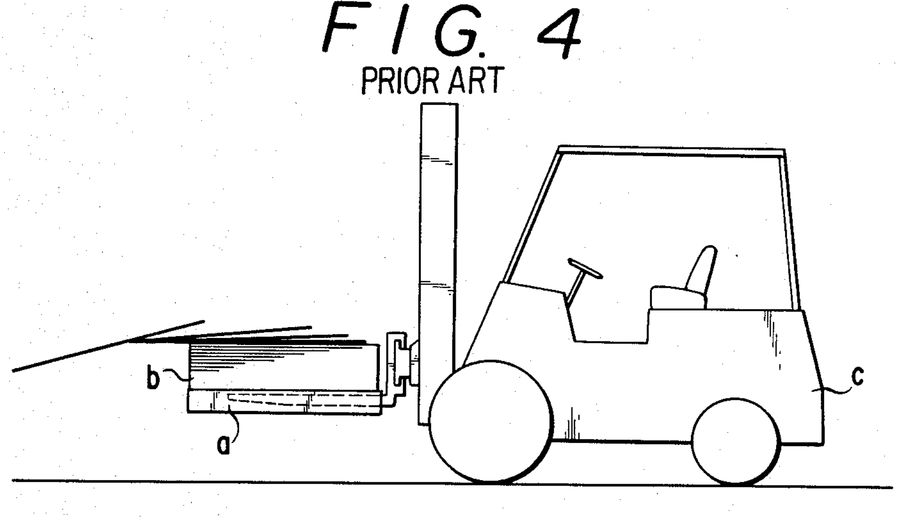
FIG. 4 PRIOR ART
FIG. 4 is a schematic side view illustrating a shortcoming of the loading and unloading apparatus in the prior art.

In the following, one preferred embodiment of the present invention will be described in greater detail with reference to FIGS. 1 and 2. In these figures, reference numeral 1 designates a main body of a loading and unloading apparatus, which main body is mounted on a finger board 4 provided on a mast 3 of a forklift truck 2. The abovementioned main body 1 includes a support plate 5 mounted on the finger board 4, and on the front surface of this support plate 5 are disposed two pairs of guide rails, that is, in total four guide rails 6 and 7 as laid in the horizontal direction. The respective guide rails 6 and 7 have a channel-shaped cross-section, and the opening sides of the channel-shaped cross-section of the respective guide rails in each pair 6 or 7 are opposed to each other. Rollers 9 pivotably supported at the base end portions of a pair of left and right arms 8,8 are fitted in the respective pairs of guide rails 6 and 7, and the left and right arms 8 are supported via these rollers 9 from the left and right arms 8,8 so as to be movable in the directions of coming close to each other and going away from each other.

The above-mentioned arms 8,8 are formed in a flat box shape, and they are adapted to be moved in the directions of coming close to each other and going away from each other by means of clamp cylinders 10,10 respectively connected between brackets *8a,8a* projecting from base end portions of the respective arms 8,8 and brackets *5a,5a* projecting from the front surface of the support plate 5, so that seat materials 16 stacked into a pile on a palette 11 can be clamped from their opposite sides by the respective arms 8,8.

Reference numeral 12 designates a fork of large width mounted to the center of the front surfaces of the respective guide rails 6 and 7, which fork is adapted to raise and lower the palette 11 by inserting its free end portion into a recess formed under the palette 11, and on the front surface of each arm 8 is provided a hook 13 serving as a front stop members. The above-described respective hooks 13 consist of vertical rod-like members somewhat larger in width than the thickness of the arm 8, and the upper and lower end portions of each hook 13 are fixedly secured to front ends of two, upper and lower, guide rods 14 accommodated within each arm 8. The guide rods 14 are provided two for each arm 8, and they are supported within each arm 8 slidably in the back and forth directions. In addition, between the upper and lower guide rods 14, a hook cylinder 15 is accommodated within each arm 8 in parallel to the guide rods 14. A base end portion of the hook cylinder 15 is pivotably secured to the arm 8, while a tip end of a piston rod 15*a* projected forwards from the hook cylinder 15 is pivotably secured to a bracket 13*a* projecting inwardly from the hook 13, so that each hook 13 can be moved in the back and forth directions of the arm 8 by the corresponding hook cylinder 15.

While the main body 1 of the loading and unloading apparatus was explained to be moved by the forklift truck 2 in the aforementioned embodiment, as a matter of course, it could be modified so as to be moved by a working vehicle other than the forklift truck 2, for instance, by an unmanned conveying vehicle.

Since the loading and unloading apparatus according to the present invention is constructed as described in detail above, upon loading or unloading sheet materials 16 stacked into a pile on a palette 11, at first the respective arms 8 are held in a laterally separated condition and the pile of sheet materials 16 on the palette 11 is positioned between the arms 8 as aligned thereto by driving the forklift truck 2. Under this condition, the fork 12 is inserted into the space under the palette 11, and is engaged with the bottom surface of the palette 11 by slightly raising the finger board 4. Thereafter, the respective arms 8 are moved towards each other to clamp the opposite sides of the pile of sheet materials 16 between the respective arms 8 by actuating the respective clamp cylinders 10. Then, the hooks 13 at the free ends of the respective arms 8 are retracted to be engaged with the corner portions along the opposite edges of the front surface of the pile of sheet materials 16, by actuating the respective hook cylinders 15. Under this condition where the sheet materials 16 in the pile are constrained from slipping out either in the forward direction nor in the sideward directions, the pile of sheet materials 16 on the palette are conveyed by a working vehicle such as a forklift truck 2 or an unmanned conveying vehicle. Therefore, even if the working vehicle should make an abrupt turn or a sudden stop, the pile of sheet materials 16 on the palette would not collapse and could be conveyed safely. In addition, owing to the fact that the sheet materials 16 are conveyed with the hooks 13 serving as front stopper means engaged with the corner portions on the front surface, even when printing was made on the surfaces of the sheet materials 16, the printed surface of the sheet materials 16 would not be blurred by the hooks 13 as in the case where a holder member holds the top surface of the pile of sheet materials 16. Moreover, since the loading and unloading work can be done without worrying about collapse of the load, the working efficiency can be enhanced remarkably.

Since many changes and modifications could be made to the above-described construction without departing from the spirit of the present invention, it is intended that all matter contained in the above description and illustrated in the accompanying drawings shall be interpreted to be illustrative and not as a limitation to the scope of the invention.

What is claimed is:

1. A loading and unloading apparatus for moving stacked sheets comprising a movable vehicle, a vertically movable main body mounted on the front of said vehicle, said main body including a fork extending forward from the front of said vehicle for positioning under and for lifting said stacked sheets, a plurality of horizontal guide rails spaced vertically and fixedly mounted on said maind body adjacent the front of said vehicle, a pair of arms at the opposite ends of said guide rails and slidably supported at their base ends via telescope means within said guide rails and extending forward from the front of said vehicle substantially parallel to said fork, a first drive means coupled to each arm of said pair of arms and to said main body for selectively moving each said arm closer to and away from the ther said arm, said first drive means including a hydraulic cylinder coupled at one of its ends to the base end of said arm and at the other of its ends to said main body, each arm of said pair of arms being formed in a flat box shape extending vertically of and forwardly from the front of said vehicle, front stopper means at the front forward end of each said arm of said pair of arms, each said front stopper means extending inwardly from the front forward end of one of said arms of said pair of arms toward the other of said pair of arms, each of said front stopper means having an upper and a lower guide rod extending into the front end of said one of said arms and a second drive means coupled to said front stopper means for moving said stopping means closer to and away from the front forward end of said arms, said second drive means having a hydraulic cylinder in said arm coupled at one of its ends to said arm and at the other end to said stopper means.

* * * * *